United States Patent [19]

Hayashi

[11] 3,864,846

[45] Feb. 11, 1975

[54] AUTOMATED STEAMING APPARATUS

[76] Inventor: Torahiko Hayashi, 2-3, Nozawa-cho, Utsunomiya, Japan

[22] Filed: Sept. 11, 1972

[21] Appl. No.: 288,141

[30] Foreign Application Priority Data

Sept. 11, 1971 Japan.............................. 46-70508

[52] U.S. Cl..................................... 34/189, 34/190
[51] Int. Cl............................................ F26b 11/18
[58] Field of Search.......... 34/36, 37, 189, 190, 209, 34/225; 198/20; 426/511

[56] References Cited
UNITED STATES PATENTS

| | | | |
|---|---|---|---|
| 1,123,934 | 1/1915 | Schrafft et al......................... | 34/189 |
| 1,511,256 | 10/1924 | Bausman................................ | 34/190 |
| 2,254,867 | 9/1941 | Bonotto.................................. | 34/37 |
| 3,605,283 | 9/1971 | Zelnick et al.......................... | 34/236 |

FOREIGN PATENTS OR APPLICATIONS

| | | | |
|---|---|---|---|
| 1,152,207 | 8/1961 | Germany............................... | 34/189 |
| 749,043 | 5/1943 | Germany............................... | 34/189 |

Primary Examiner—Kenneth W. Sprague
Assistant Examiner—James C. Yeung

[57] ABSTRACT

An automated steaming apparatus and method, said apparatus comprising an enclosed housing with an inlet at a portion near the bottom of the housing and an outlet at a portion near the top of the housing, said inlet and outlet being arranged to be closed except when materials are conveyed into or out from the housing; a conveyor means for receiving materials positioned next to said inlet, a conveyor means for steaming materials positioned above said receiving conveyor means and arranged to conduct upward movements so as to elevate materials, and a conveyor means for discharging materials positioned above said steaming conveyor means and next to said outlet, said receiving and discharging conveyor means being operated at higher velocities than said steaming conveyor means; and a pipe for supplying steam into the housing and positioned at a lower portion of the housing. Said steaming conveyor means comprises at least a pair of chain conveyors disposed adjacent to opposite inner walls of the housing and mounted at regular intervals with a plurality of L-shaped bars by means of pins rotatably connected to links of said conveyors, each of the bars on the chain conveyor on one side corresponding in its position to each of the bars on the other chain conveyor, an arm of each bar on a chain conveyor being arranged to support a tray for materials in cooperation with an arm of the corresponding bar on the other chain conveyor, the other arm of each bar engaging a rail mounted along the inner passage of each of the chain conveyors so as to support the tray supporting arm.

2 Claims, 4 Drawing Figures

AUTOMATED STEAMING APPARATUS

This invention relates to an apparatus for the automated steaming of materials. More particularly, it relates to an automated apparatus for steaming materials such as confectionery or sea food, proofing pieces of dough for bread and the like or defrosting food products and the like.

In the past, a conventional automated steaming or heating operation has been to provide a tunnel-shaped housing through which a conveyor loaded with materials are made to pass and to steam the materials on the conveyor during their stay in the housing. According to the conventional process, the inlet and the outlet of the housing are kept open during the heating operation and the loss of heat energy from the apparatus has been substantial. Also, it has been practically impossible to find sufficient lengths of time for closing the inlet and the outlet because trays, nets and the like conveyed on the feed conveyor to the steaming apparatus in succession often leave no substantial spaces therebetween.

The present invention has made it possible to close the inlet and the outlet of the housing of the apparatus for substantial lengths of time, thus enabling to accomplish a high heat efficiency without losing substantial amounts of heat energy as in the case of the conventional apparatus. According to the present invention, the steaming of materials is separated into three stages, namely, the stage for receiving materials into the steaming chamber in the housing, the stage for steaming per se, and the stage for discharging materials which have completed the steaming operation, and the receiving and discharging stages are arranged to be operated promptly while the stage for steaming per se is operated sufficiently slowly. The operation of the receiving and discharging stages at different velocities from that of the steaming stage has enabled the steaming operation to be conducted while the inlet and the outlet of the steaming chamber are closed for the substantial portion of the steaming operation.

According to another feature of the present invention, materials introduced into the steaming chamber are vertially conveyed within the chamber during the steaming operation. They are elevated and discharged from an outlet positioned near the highest point of the steaming chamber. The vertical movements of materials are accomplished by vertically operated conveyor means. Also, in one aspect of the present invention, the steaming apparatus is provided with a means for the supply of steam into the steaming chamber from a lower portion thereof. The above feature reduces the surface area of the steaming chamber to the minimum and makes it possible to utilize the space for steaming more efficiently than the conventional apparatus in which materials are transported in horizontal directions, thus enabling to substantially decrease the size of the steaming appratus in general and to utilize heat convection efficiently. The apparatus of the present invention can be used not only as a steaming device but also as a proofer or a defroster.

Thus, an object of the present invention is to provide an automated apparatus for steaming, proofing or defrosting with high heat efficiency.

Another object of the present invention is to provide an automated apparatus for steaming, proofing or defrosting, wherein steaming is conducted with sufficient time while the steaming chamber is isolated from the ambient atmosphere.

A further object of the present invention is to provide an automated apparatus for steaming, proofing or defrosting materials, in which apparatus materials are processed while being moved in the steaming chamber upwards, thus attaining most efficient heat utilization.

The above, and other objects, features and advantages of the invention will be apparent in the following detailed description of illustrative embodiments thereof which is to be read in connection with the accompanying drawing wherein.

Figure 1:
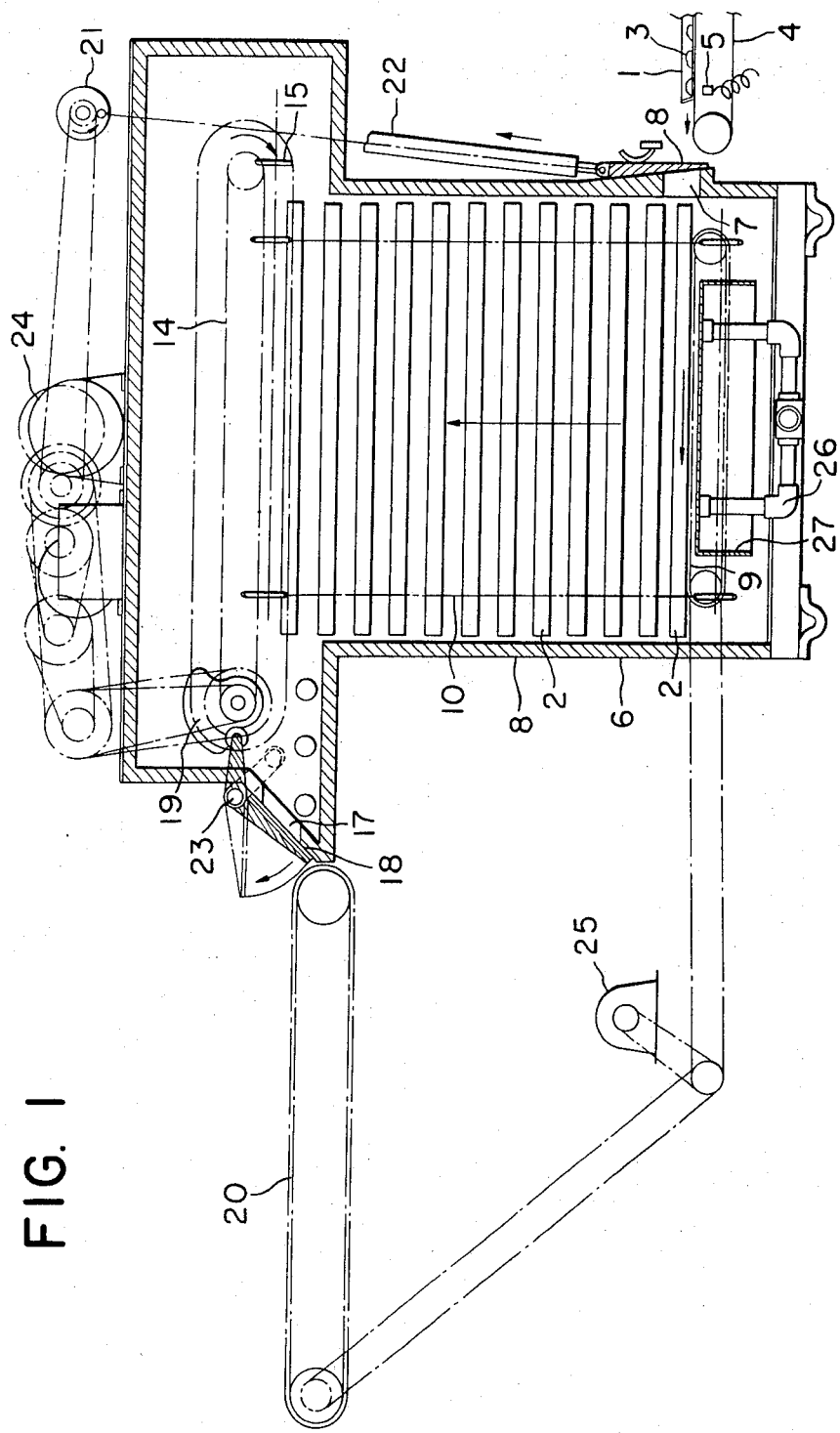
FIG. 1 is a view in vertical section of an embodiment of the present invention.

Referring now to the drawings, a tray 1 with a bottom formed with wire netting is loaded with materials 3 for confectionery, bread and the like. The tray 1 is placed on a feed conveyor 4 provided adjacent to the inlet 7 to the housing 6. A sensing swithch 5 is mounted at a protion of the feed conveyor 4 near its end adjacent to the inlet 7.

The inlet 7 is closed by a door 8, which is opened or closed in vertical directions by a rod 22 operated by a crank 21 in response to signals emitted by the sensing switch 5. A receiving conveyor 9 is positioned near the bottom of the chamber within the housing 6. The receiving conveyor 9 receives the tray 1 entering the housing 6 through the inlet 7 and guides into the housing. The receiving conveyor 9 is continuously operated at a speed somewhat faster than the feed conveyor 4.

Figure 2:
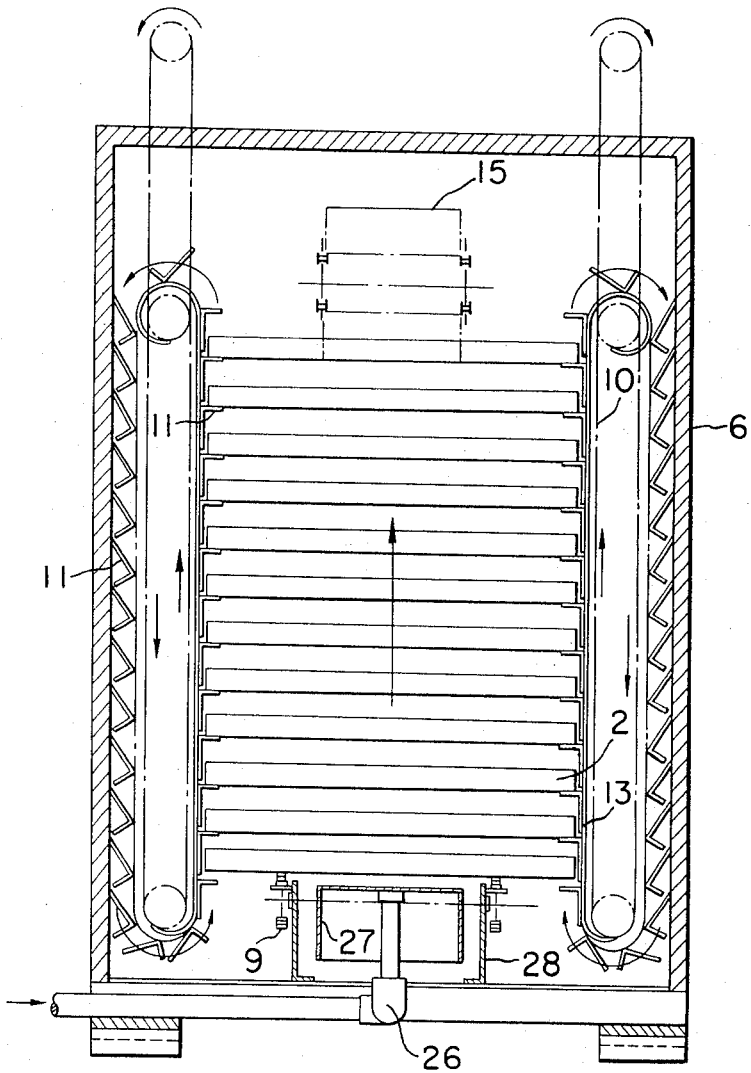
FIG. 2 is a view in cross section of the embodiment in FIG. 1, parts broken away.
Figure 3:
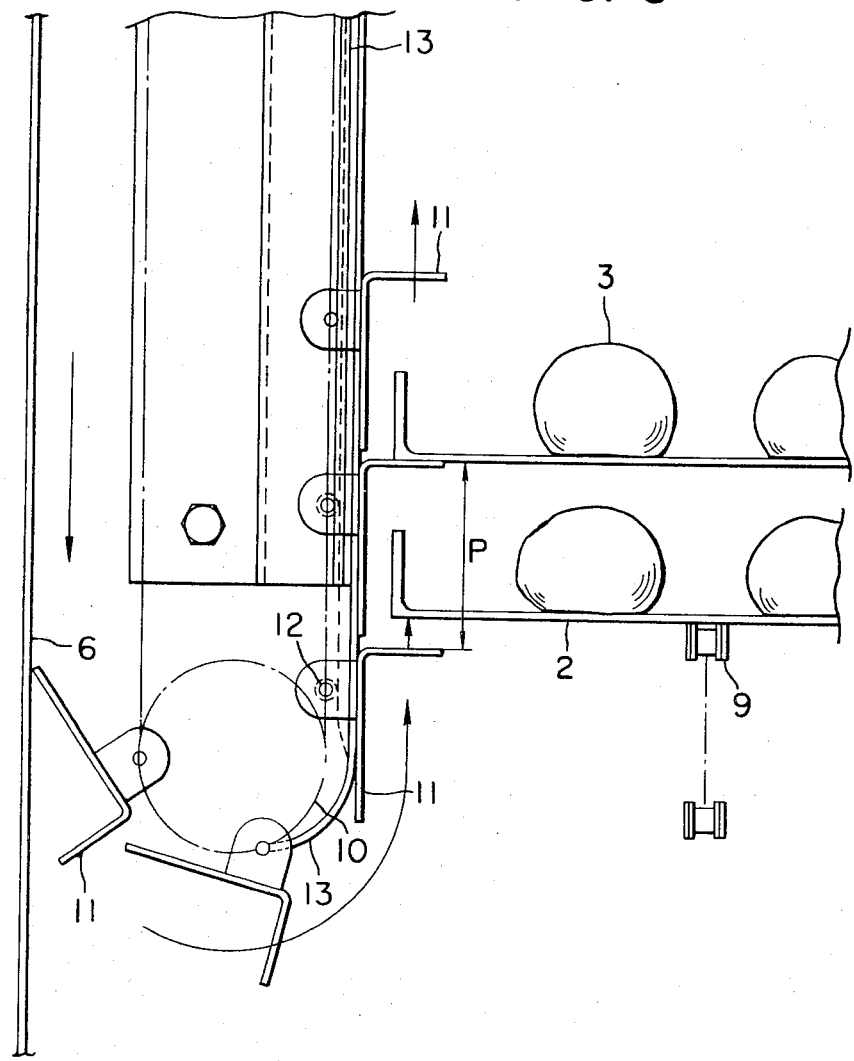
FIG. 3 is an enlarged view of a portion of FIG. 2.

Two pairs of chains 10 operated in vertical directions are provided adjacent to the inner walls of the housing as illustrated in FIG. 2, each pair adjacent to on of the inner walls sufficiently spaced apart from each other as illustrated in FIG. 1. Each pair of chains 10 are provided with bars 11 extending over the pair of chains around their circumferences spaced apart from each other at the interval of p as illustrated in FIG. 2 and FIG. 3. Each bar affixed to a pair of chains is arranged to be in the same level as the corresponding bar 11 in the other pair of chains. The bars on both pairs of chains are moved in synchronization by the synchronized movements of the two pairs of chains 10.

The bar 11, in an embodiment of the present invention, is a plate consisting of two arms connected to each other to form an L-shaped plate and is provided with a pin 12 rotatably connected to a link of the chain 10. An arm of the bar supports an end of the tray 2 and the other arm of the bar comes in contact with a rail 13 mounted along the inner passage of the chain 10 so as to prevent the tray supporting arm from falling during its upward movement with the tray.

In those portions of the passage of the bars 11 where they descend, namely the space between the outer passage of the chain 10 and the adjacent inner wall of the housing 6, the bars 11 are separated from the rail 13, revolve about the pins 12 which constitute free joints, and descend through the vertical passage with their ends supported by the inner wall of the housing 6.

The above structure provides a safe support for trays 2 and enables to keep the space between the chain 10 and the inner wall of the housing 6 to the minimum even though the arms of the bar 11 are sufficiently long for the safe support of the tray 2. The latter advantage results in maximizing the effective capacity of the steaming chamber.

Figure 4:
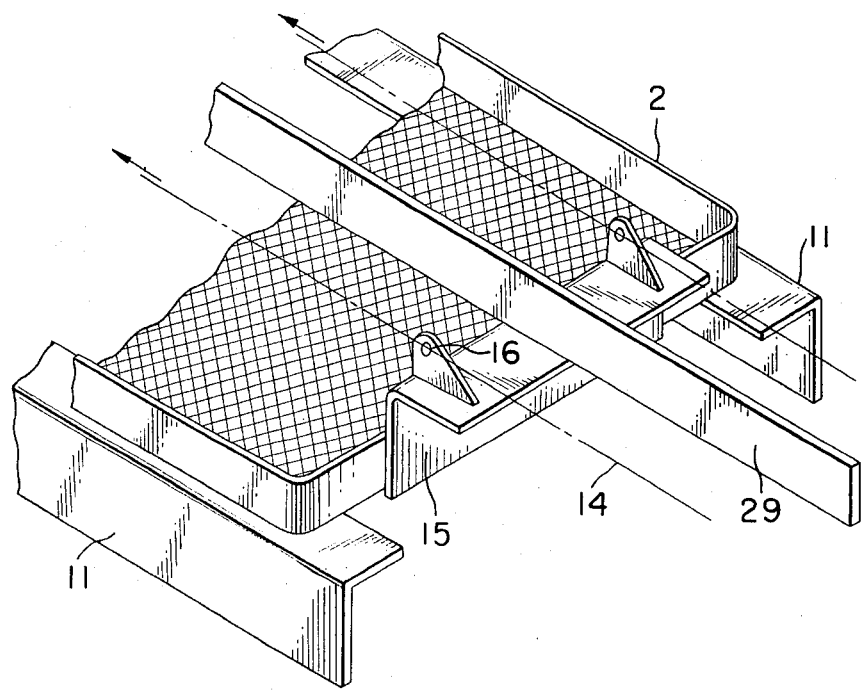
FIG. 4 is a perspective view of a portion of the embodiment in FIG. 1.

In FIG. 1 and FIG. 4, a pair of discharge chains 14 positioned at the highest level of the steaming chamber are mounted with a push plate 15 by means of a pair of pins 16. The push plate 15, like the structure of the bar 1 and the chains 10, is L-shaped and when an arm of the push plate 15 pushes the tray 2, the lower surface of a rail 29 running horizontally above the passage of the tray 2 holds down the other arm of the push plate 15 so as to stabilize the push operation.

The tray 2, which has undergone steaming operation, is taken out from the outlet 17 closed with a door 18 except for the time for discharge. The door 18 is operated by a cam 19, whcich moves the door about the pin 23. The tray 2, when discharged, is received by a receiving conveyor 20 for further processing.

The prime mover 24 is caused to revolve by the pulse of the sensing switch 5 and stops automatically after a cycle of revolution. During the above cycle of revolution, the inlet door 8 and the outlet door 18 are opened, the discharge chains accomplish a revolution, and then the two doors are closed, and the upward moving chains 10 are elevated by the distance p.

The opening of the inlet door 8 and the outlet door 18, or the closing of the inlet door and the outlet door may be conducted at the same time, but the opening of the inlet door should not be operated at the same time as the chains are elevated. Nor should the discharge chains be operated at the same time as the elevation of the upward moving chains. The outlet door should be opened always at the same time as the discharge chains are put in motion, and the closing of the outlet door should always be synchronized with the stoppage of the operation of the discharge chains. These operations are attained by the Geneva mechanism provided between the prime mover 24 and the input shafts of the respective parts.

The material receiving conveyor 9 and the product receiving conveyor 20 are both operated continuously by a small motor 25. Steam is introduced into the housing 6 through a pipe 26 which opens immediately underneath the receiving conveyor 9 in FIG. 1 and FIG. 2, but it may open at some other place at a lower portion of the housing. A grid-formed net 27 illustrated in FIG. 2 is positioned adjacent to the outlets of the steam pipe 26 and helps the diffusion of the steam. The material receiving conveyor 9 is supported by a pair of support members as illustrated in FIG. 2 and is positioned as in FIG. 3 so as to hold the tray 2 entering the housing 6 slightly above the bar 11 for easy handling.

In operation, materials 3 on the tray 1 approaching the inlet 7 are sensed by the sensing switch 5, which causes the prime mover 24 to start operation. Due to the operation of the prime mover 24, the door 8 opens and the tray 1 enters the housing 6 and is transported to the interior of the housing by the receiving conveyor 9. Though the receiving conveyor is continuously operated regardless of the moving system connected to the prime mover 24, the tray 2 in the housing stops its motion into the interior of the housing by its engagement with the inner wall of the housing opposite the inlet and temporarily slips on the receiving conveyor 9. Then, the door 8 closes and the bars 11 fixed to the chains 10 start upward movements. The tray 2 is stationary, positioned in the middle of the pairs of bars 11 and slightly higher than the bars, before engaging the bars. When the bars come into contact with the tray in their upward movements, they support the ends of the tray and carry the tray upwards. The upward movement stops when the tray rises the distance of p. Subsequently, the outlet door 18 is opened and the push plate 15 is operated. After the tray 2 has reached the highest level in the housing, and during the halt of the bars 11 preceding their reverse trun for their descent, the tray is pushed out from the housing 6 by the push plate 15 so as to be received by the product receiving conveyor 20. The length of time required for the elevation of the tray from the time it is picked up by the bars 11 to the time it leaves the housing from the highest level corresponds to the steaming time of the apparatus of this invention.

It has been found that the apparatus of the present invention can be safely operated with the receiving conveyor 9 and the discharge chains operated at a velocity of 15 meters per minute. In this instance, the length of time during which the door is kept open can be reduced to 3.5 seconds.

The length of time during which the door is closed, namely the interior of the housing 6 is completely isolated from the exterior, is 1 min. 56 sec, with an apparatus with a capacity to accomodate 10 trays in terms of the effective number of levels of the bars 11 and with the steaming time for each piece set at 20 minutes. A test was conducted using the apparatus embodying this invention to manufacture continuously 2,400 pieces of steamed dumpling, each piece weighing 50 grams, and each tray carrying 80 pieces. The inlet and the outlet of the housing were opened and closed simultaneously. The result of the test was very satisfactory. The above results indicate that if the inlet and the outlet are opened and closed simultaneously the apparatus of the present invention enables the length of time during which the housing is closed to be about 33 times the length of time during which the housing is opened.

According to a test as to the amount of steam used for the production of the above steamed dumplings, the apparatus of the present invention consumed 21 Kg/hr of steam, which is substantially smaller than the amount of steam in the range of 70 Kg/hr ~ 80 Kg/hr used in the conventional horizontal tunnel-type steaming device, thus attaining substantial improvement in thermal efficiency.

Although illustrative embodiments of this invention have been described in detail herein with reference to the accompanying drawings, it is to be understood that the invention is not limited to the above and that various changes and modifications may be effected therein by those skilled in the art without departing from the scope or spirit of the invention. What is claimed Is:

1. An automated apparatus for processing food material, comprising,
    a. an enclosed housing having an inlet door and an outlet door, one door near the bottom of the housing and the other door near the top of said housing,
    b. conveyor means for receiving food trays positioned adjacent to said inlet door,
    c. conveyor means for discharging food trays positioned adjacent to said outlet door,
    d. a conveyor means for vertically transporting food trays positioned between said receiving and said discharging conveyor means and comprising at least a pair of vertical chain conveyors disposed adjacent to opposite inner walls of said housing,
e. a plurality of L-shaped bars mounted on said vertical chain conveyors,
f. said L-shaped bars being connected to the links of said chain conveyors by means of pins about which said L-shaped bars are rotatable,
g. one arm of each L-shaped bar being adapted to support a tray for food material in cooperation with an opposing bar on the other chain conveyor,
h. the other arm of said L-shaped bar slideably engaging a rail mounted along the inner passage of each of the chain conveyors,
i. whereby each of said bars, upon leaving said inner passage, rotate about said pin until said tray supporting arm of said L-shaped bar forms an angle other than a right angle with a vertical plane, thereby reducing the horizontal distance between said pin and the outermost end of said L-shaped bar.

2. The apparatus according to claim 1, wherein
a. each of said doors is adapted to be closed except when food trays are conveyed into or out of the housing and
b. both of said conveyor means are operated at higher velocities than the chain conveyor.

* * * * *